US010065370B2

(12) United States Patent
Lyons et al.

(10) Patent No.: US 10,065,370 B2
(45) Date of Patent: Sep. 4, 2018

(54) METHOD OF MAKING A MONOLITHIC PART

(71) Applicant: The Boeing Company, Chicago, IL (US)

(72) Inventors: Brett I. Lyons, Burien, WA (US); Aaron W. Bartel, Portland, OR (US); Trevor E. Tucker, Seattle, WA (US)

(73) Assignee: The Boeing Company, Chicago, IL (US)

(*) Notice: Subject to any disclaimer, the term of this patent is extended or adjusted under 35 U.S.C. 154(b) by 222 days.

(21) Appl. No.: 15/215,978

(22) Filed: Jul. 21, 2016

(65) Prior Publication Data
US 2016/0325494 A1 Nov. 10, 2016

Related U.S. Application Data

(62) Division of application No. 14/252,816, filed on Apr. 15, 2014, now Pat. No. 9,452,840.

(51) Int. Cl.
B29C 41/22 (2006.01)
B29C 67/00 (2017.01)
(Continued)

(52) U.S. Cl.
CPC ........ B29C 67/0066 (2013.01); B22F 3/1055 (2013.01); B29C 64/118 (2017.08); B29C 64/124 (2017.08); B29C 64/129 (2017.08); B29C 64/135 (2017.08); B29C 64/153 (2017.08); B29C 67/0062 (2013.01); B29C 67/0077 (2013.01); B32B 1/08 (2013.01); B32B 3/266 (2013.01); B32B 3/30 (2013.01);
(Continued)

(58) Field of Classification Search
CPC ..... B22F 3/1055; B29C 41/22; B29C 64/118; B29C 64/124; B29C 64/129; B29C 64/135; B29C 64/153
USPC ............ 264/261, 308, 401, 497; 219/121.66, 219/121.85
See application file for complete search history.

(56) References Cited

U.S. PATENT DOCUMENTS 3,617,699 A 11/1971 Othmer
3,677,687 A 7/1972 Siegfried et al.
(Continued)

FOREIGN PATENT DOCUMENTS

DE 19903436 8/2000
DE 2006062373 6/2008
(Continued)

Primary Examiner — Leo B Tentoni
(74) Attorney, Agent, or Firm — Perman & Green, LLP

(57) ABSTRACT

A method of forming a monolithic aircraft part includes additively forming a first cavity, defined by a first wall of the part, additively forming a second cavity, defined by a second wall of the part, so that the first cavity and the second cavity are not in communication with each other and share a common wall portion so that the second cavity is partially contained within the first cavity. Additively forming the first cavity includes forming a first aperture, extending through the first wall, forming a second aperture, extending through the first wall, and forming a first inner surface of the first wall, defining a first shape, wherein a first object, permanently having the first shape, would not be able to be mechanically extracted from the first cavity via the first aperture or the second aperture.

20 Claims, 8 Drawing Sheets

(51) Int. Cl.

| | | |
|---|---|---|
| *B33Y 10/00* | (2015.01) | |
| *F16L 9/00* | (2006.01) | |
| *B32B 3/26* | (2006.01) | |
| *B32B 1/08* | (2006.01) | |
| *B29C 64/124* | (2017.01) | |
| *B29C 64/118* | (2017.01) | |
| *B22F 3/105* | (2006.01) | |
| *B29C 64/135* | (2017.01) | |
| *B29C 64/129* | (2017.01) | |
| *B29C 64/153* | (2017.01) | |
| *B33Y 80/00* | (2015.01) | |
| *B32B 3/30* | (2006.01) | |
| *B29L 31/30* | (2006.01) | |
| *F16L 9/21* | (2006.01) | |

(52) U.S. Cl.
CPC .............. *B33Y 10/00* (2014.12); *B33Y 80/00* (2014.12); *F16L 9/006* (2013.01); *B29K 2995/0016* (2013.01); *B29K 2995/0091* (2013.01); *B29L 2031/3076* (2013.01); *B32B 3/263* (2013.01); *B32B 2605/18* (2013.01); *F16L 9/21* (2013.01)

(56) References Cited

U.S. PATENT DOCUMENTS

| | | |
|---|---|---|
| 4,053,126 A | 10/1977 | Duret et al. |
| 4,485,057 A | 11/1984 | Kristensson et al. |
| 4,833,000 A | 5/1989 | Trickett et al. |
| 5,013,514 A | 5/1991 | Azzani et al. |
| 5,031,120 A | 7/1991 | Pomerantz et al. |
| 5,109,589 A | 5/1992 | Cramer et al. |
| 5,139,711 A | 8/1992 | Nakamura et al. |
| 5,216,616 A | 6/1993 | Masters |
| 5,296,335 A | 3/1994 | Thomas et al. |
| 5,439,402 A | 8/1995 | Dai et al. |
| 5,616,293 A | 4/1997 | Ashtiani-Zarandi et al. |
| 5,734,168 A | 3/1998 | Yao |
| 5,824,260 A | 10/1998 | Sauerhoefer |
| 5,847,958 A | 12/1998 | Saikh et al. |
| 5,851,456 A | 12/1998 | Mukawa et al. |
| 5,876,282 A | 3/1999 | Kenny |
| 6,086,330 A | 7/2000 | Press et al. |
| 6,158,497 A | 12/2000 | Lange et al. |
| 6,391,251 B1 | 3/2002 | Keicher et al. |
| 6,405,435 B1 | 6/2002 | Konter et al. |
| 6,450,393 B1 | 9/2002 | Doumanidis et al. |
| 6,530,956 B1 * | 3/2003 | Mansmann ......... A61F 2/30756 623/18.11 |
| 6,562,278 B1 | 5/2003 | Farnworth et al. |
| 6,682,688 B1 | 1/2004 | Higashi et al. |
| 6,955,023 B2 | 10/2005 | Rotheroe |
| 7,059,565 B2 | 6/2006 | Scown et al. |
| 7,575,708 B2 | 8/2009 | Degrange et al. |
| 7,699,078 B1 | 4/2010 | Husmann, Jr. |
| 7,863,035 B2 | 1/2011 | Clemens et al. |
| 8,664,742 B2 | 3/2014 | Wells et al. |
| 2002/0047229 A1 | 4/2002 | Yanagisawa et al. |
| 2002/0076541 A1 | 6/2002 | Jarmon et al. |
| 2003/0186042 A1 | 10/2003 | Dunlap et al. |
| 2003/0203158 A1 | 10/2003 | Farnworth et al. |
| 2003/0206820 A1 | 11/2003 | Keicher et al. |
| 2004/0021256 A1 | 2/2004 | Degrange et al. |
| 2004/0025905 A1 | 2/2004 | Ederer et al. |
| 2004/0156478 A1 | 8/2004 | Appleby et al. |
| 2004/0175451 A1 | 9/2004 | Maekawa et al. |
| 2005/0278061 A1 | 12/2005 | Degrange et al. |
| 2006/0025878 A1 | 2/2006 | Ferren et al. |
| 2006/0286862 A1 | 12/2006 | Lubinsky et al. |
| 2006/0290022 A1 | 12/2006 | Sundrla |
| 2007/0051704 A1 | 3/2007 | Husmann et al. |
| 2007/0278794 A1 | 12/2007 | Huskamp et al. |
| 2008/0200343 A1 | 8/2008 | Clemens et al. |
| 2008/0243455 A1 | 10/2008 | Wood |
| 2008/0268762 A1 | 10/2008 | Bruggen et al. |
| 2009/0217525 A1 | 9/2009 | Fuller |
| 2009/0258168 A1 | 10/2009 | Barcock et al. |
| 2009/0286433 A1 | 11/2009 | Watanabe |
| 2010/0003619 A1 | 1/2010 | Das et al. |
| 2010/0121475 A1 | 5/2010 | Lyons |
| 2010/0294564 A1 | 11/2010 | Guthke et al. |
| 2010/0314794 A1 | 12/2010 | Dietrich et al. |
| 2011/0057056 A1 | 3/2011 | Ziminsky et al. |
| 2011/0253836 A1 | 10/2011 | Hashberger |
| 2011/0253878 A1 | 10/2011 | Klahn et al. |
| 2012/0060468 A1 | 3/2012 | Dushku et al. |
| 2012/0067501 A1 | 3/2012 | Lyons |
| 2012/0104172 A1 | 5/2012 | Haug et al. |
| 2012/0132310 A1 | 5/2012 | Cavaliere et al. |
| 2012/0192424 A1 | 8/2012 | Cataldo et al. |
| 2012/0266439 A1 | 10/2012 | Geiger |
| 2013/0011562 A1 | 1/2013 | Varanka et al. |
| 2013/0276461 A1 | 10/2013 | Propheter-Hinckley et al. |
| 2013/0277962 A1 | 10/2013 | Shinners |
| 2013/0303002 A1 | 11/2013 | Oosterhuis et al. |
| 2013/0323473 A1 | 12/2013 | Dietsch et al. |
| 2014/0021217 A1 | 1/2014 | Chen et al. |
| 2014/0084583 A1 | 3/2014 | Hemingway et al. |
| 2014/0173896 A1 | 6/2014 | Tryon et al. |
| 2014/0182292 A1 | 7/2014 | Hudon et al. |
| 2014/0190186 A1 | 7/2014 | Spooner et al. |
| 2014/0199177 A1 | 7/2014 | Hickley et al. |
| 2014/0205454 A1 | 7/2014 | Giovannetti et al. |
| 2014/0216042 A1 | 8/2014 | Hanson |
| 2014/0222183 A1 | 8/2014 | Streckert |
| 2015/0053291 A1 | 2/2015 | Hummel et al. |
| 2015/0064299 A1 | 3/2015 | Koreis |
| 2015/0096631 A1 | 4/2015 | Regan |
| 2016/0222790 A1 * | 8/2016 | Spangler ................ F01D 5/147 |

FOREIGN PATENT DOCUMENTS

| | | |
|---|---|---|
| DE | 102011101302 | 11/2012 |
| DE | 102013205244 | 9/2014 |
| EP | 1548701 | 6/2005 |
| EP | 2801512 | 11/2014 |
| EP | 2871433 | 5/2015 |
| FR | 2864199 | 12/2003 |
| GB | 1427586 | 3/1976 |
| GB | 2440546 | 2/2008 |
| GB | 2440547 | 2/2008 |
| JP | 11248048 | 9/1999 |
| JP | 2013160198 | 8/2013 |
| WO | 2015022527 | 2/2015 |
| WO | 2015033141 | 3/2015 |

\* cited by examiner

METHOD OF MAKING A MONOLITHIC PART

CROSS REFERENCE TO RELATED APPLICATIONS

This application is a divisional of and claims the benefit of non- provisional patent application Ser. No. 14/252,816 filed on Apr. 15, 2014 , now U.S. Pat. No. 9,452,840 the disclosure of which is incorporated herein by reference in its entirety.

BACKGROUND

Passenger space within a vehicle, such as an aircraft, is an important factor pertaining to the comfort and efficiency of travel. Generally, at least some space within, for example, a passenger cabin of the vehicle, is occupied by systems components (e.g. electrical components, hydraulic components, cabin-air components, etc.) which decrease the amount of space in the passenger cabin that is available for passenger occupancy.

Conventionally, systems components are assembled from multiple parts that include, for example, insulation blankets, wire stand-offs, ducts, and clamps. While multi-part assemblies are acceptable if sufficient room is available, they may not be suitable when space is limited. Additionally, multi-part assemblies require sophisticated part-tracking systems as well as increased amounts of dedicated storage space, part-specific tooling, and assembly resources, which may contribute to higher manufacturing costs and longer lead times.

SUMMARY

Accordingly, a monolithic part and method of forming thereof, intended to address the above-identified concerns, would find utility.

One example of the present disclosure relates to a monolithic part including an exterior wail and a first cavity. The first cavity includes a first aperture in communication with the exterior wall and a first inner surface defining a first shape. The first shape prevents extraction from the first cavity, via the aperture, of a first virtual object having the first shape.

One example of the present disclosure relates to a method of forming a part. The method includes additively forming an exterior wall of the part, additively forming a first aperture in communication with the exterior wall, and additively forming a first inner surface of a first cavity, wherein the first inner surface defines a first shape that prevents extraction from the first cavity, via the first aperture, of a first virtual object having the first shape.

BRIEF DESCRIPTION OF THE DRAWINGS

Figure 1:
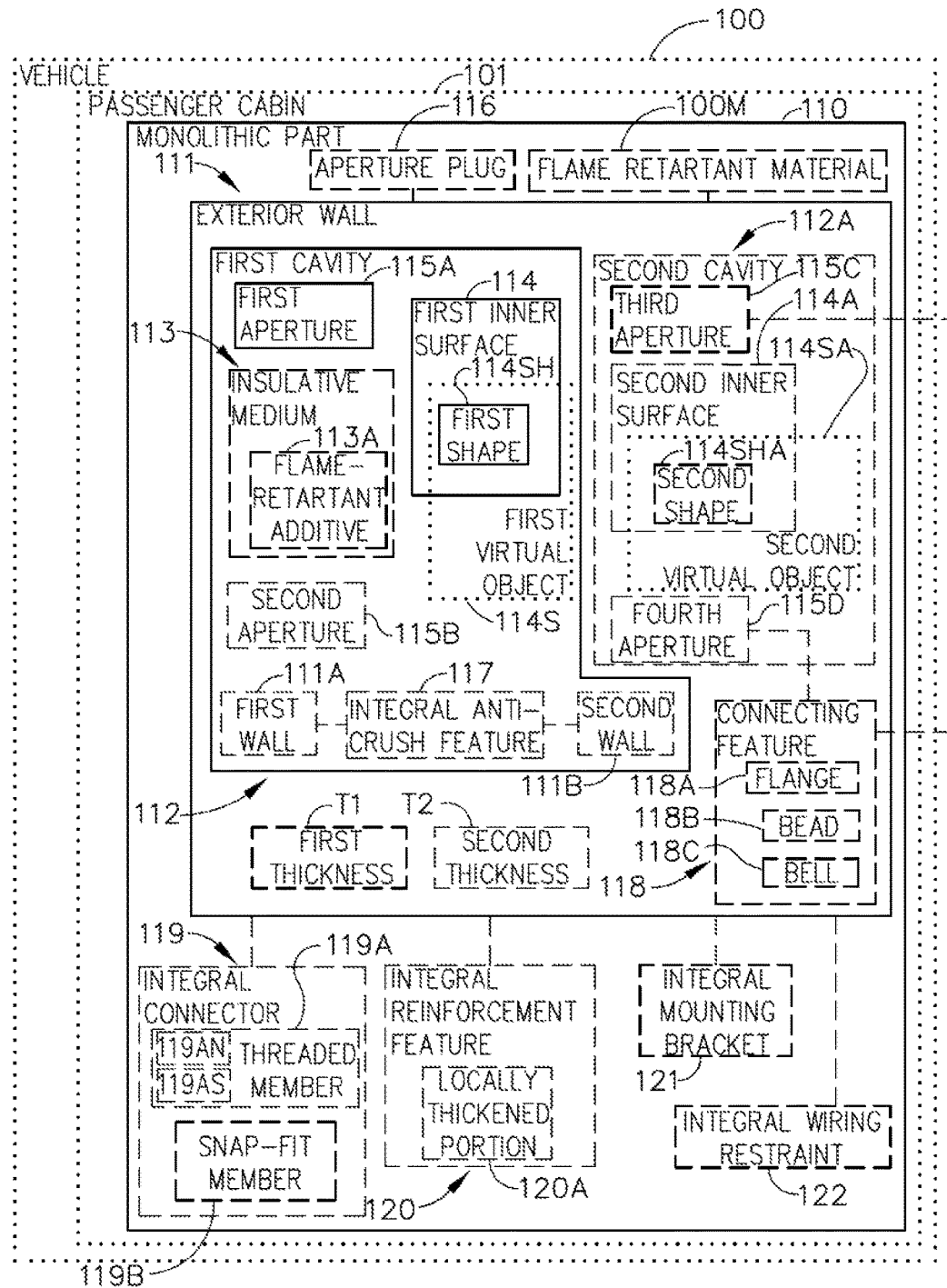
Figure 2:
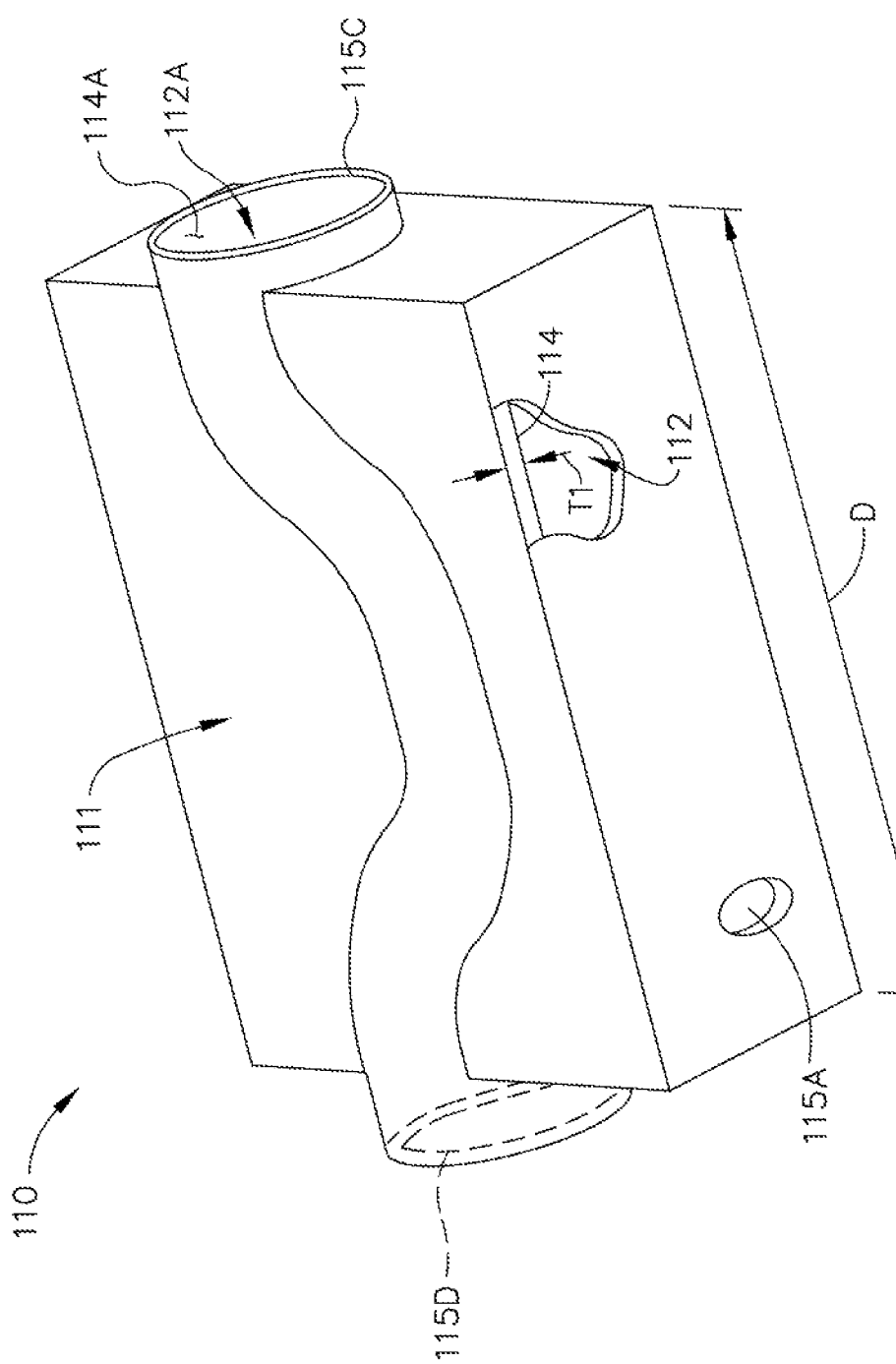
Figure 2A:
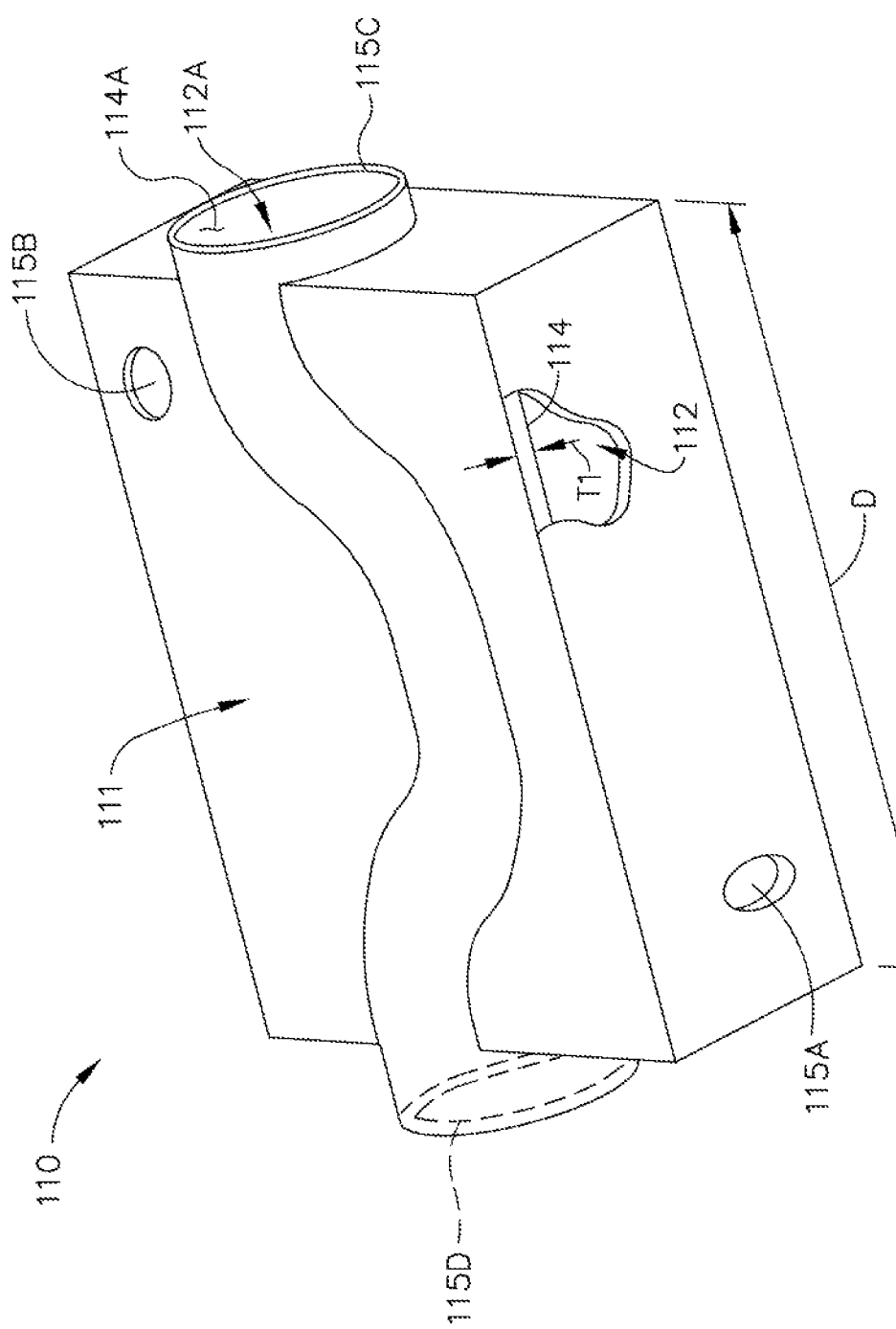
Figure 4:
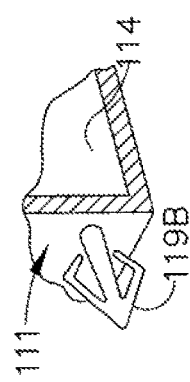
Figure 3:
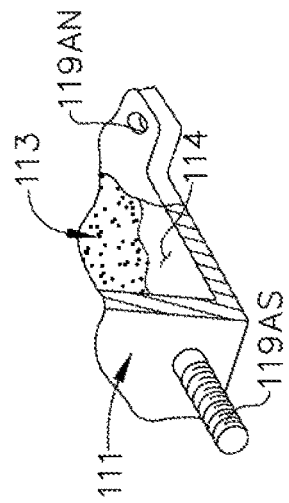
Figure 2B:
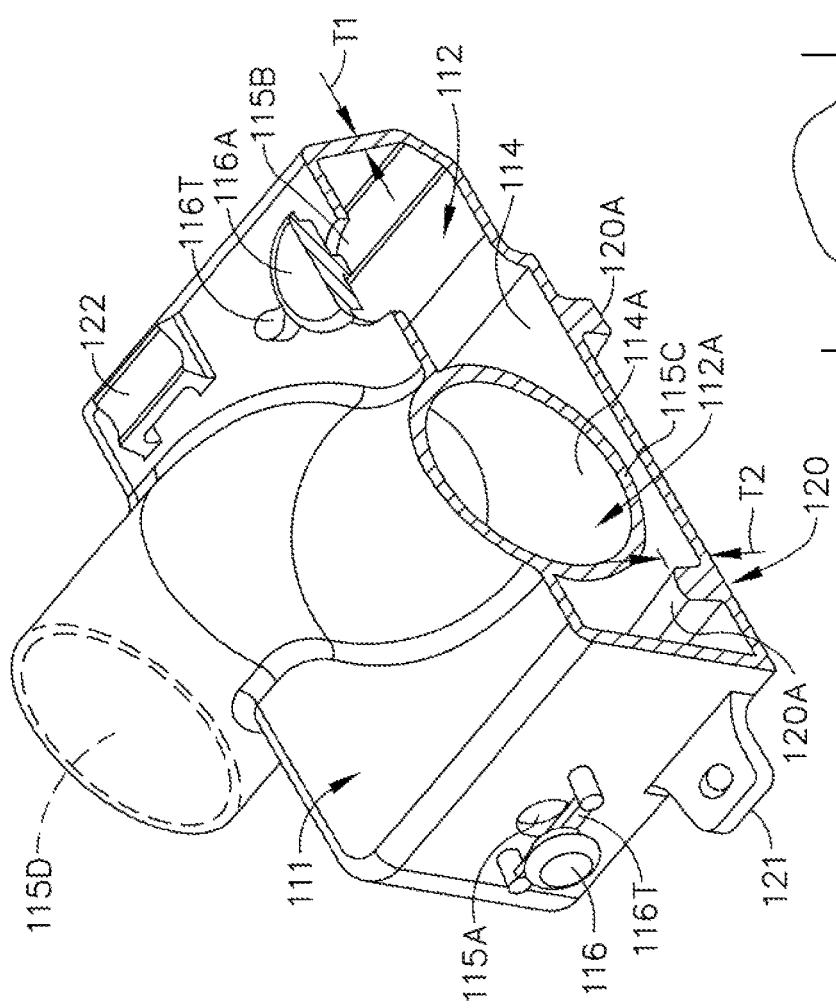
Figure 2C:
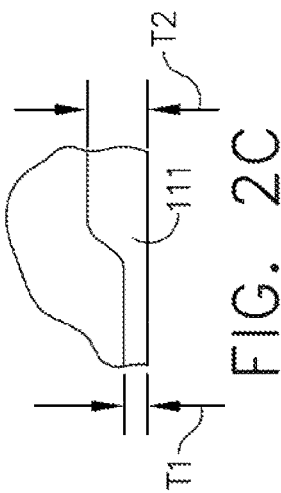
Figure 5A:
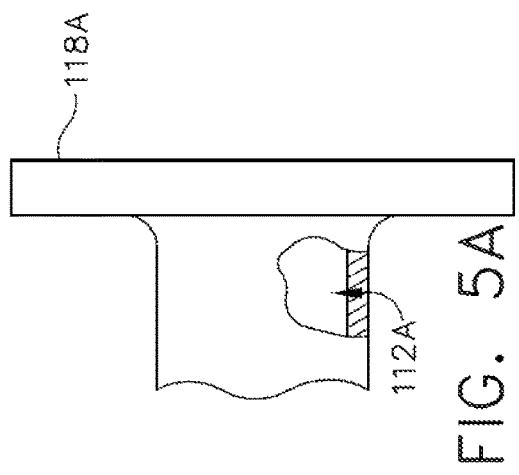
Figure 6:
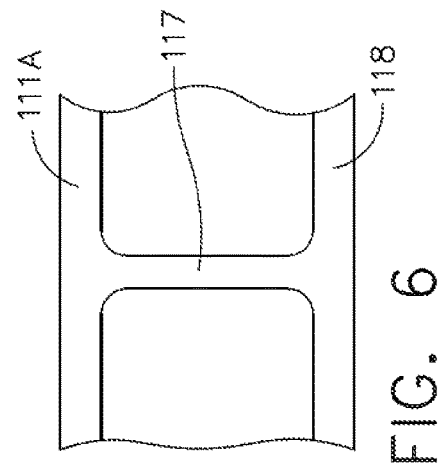
Figure 5C:
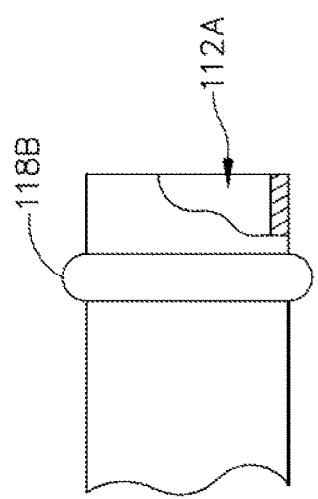
Figure 5B:
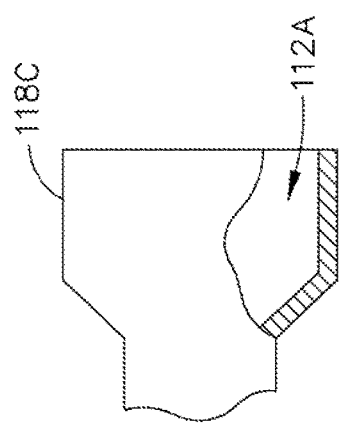
Figure 7:
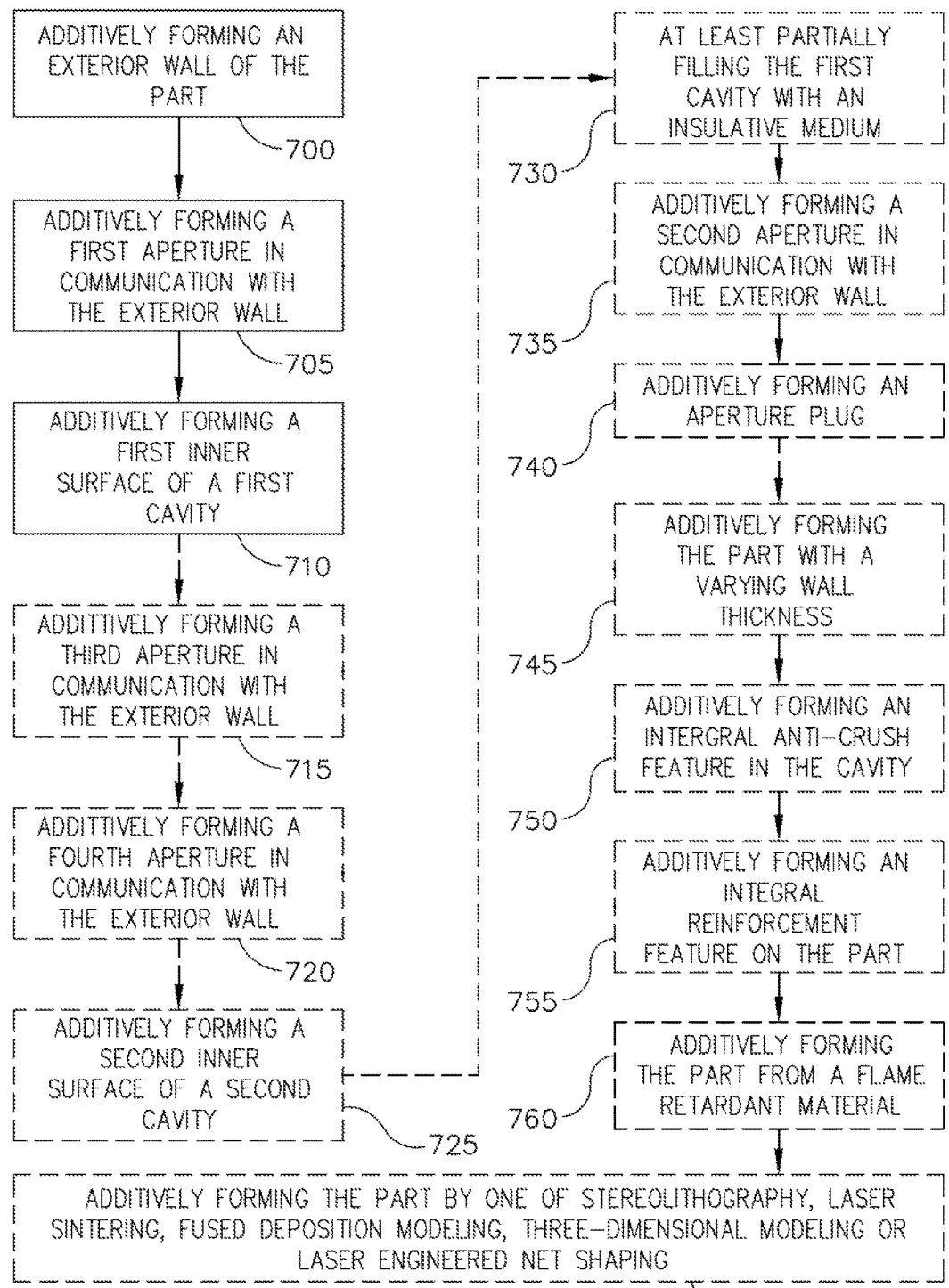
Figure 8:
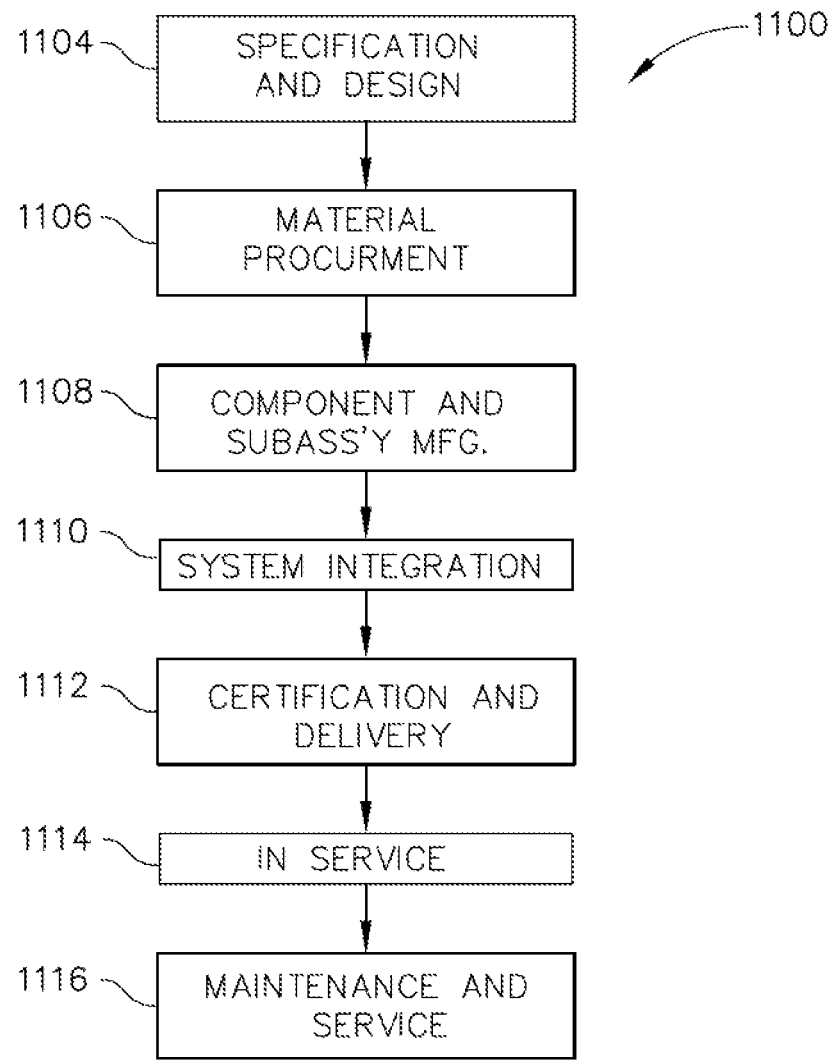
Figure 9:
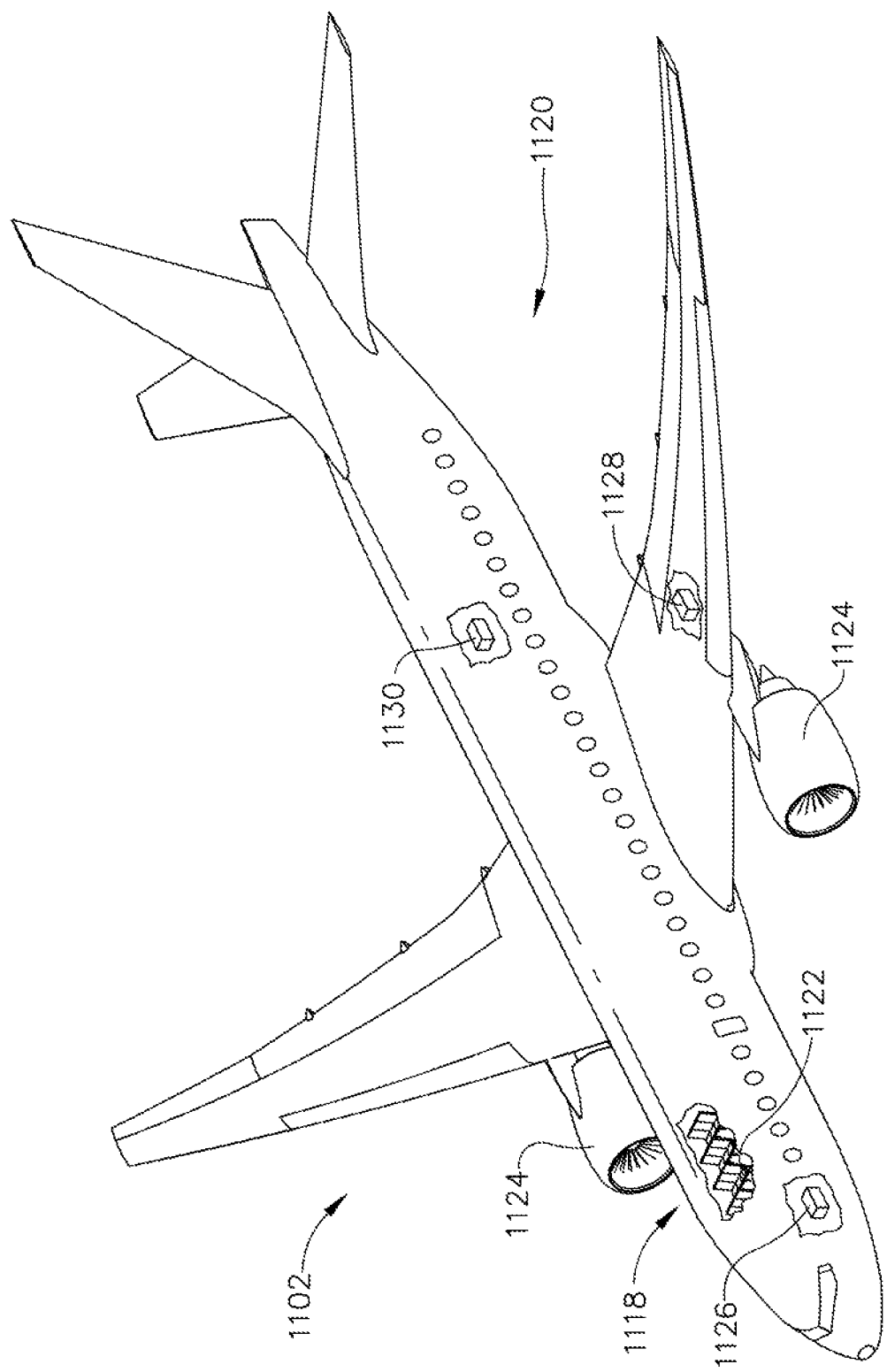

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a monolithic part according to one aspect of the present disclosure;

FIG. 2 is a schematic perspective view of the monolithic part of FIG. 1, according to one aspect of the disclosure;

FIG. 2A is as schematic perspective view of the monolithic part of FIG. 1, according to one aspect of the disclosure;

FIG. 2B is a schematic perspective sectional view of a portion of the monolithic part of FIG. 2A, according to one aspect of the disclosure;

FIG. 2C is a schematic illustration of a portion of the monolithic part of FIG. 2B, according to one aspect of the disclosure;

FIG. 3 is a schematic illustration of a portion of the monolithic part of FIG. 1, according to one aspect of the disclosure;

FIG. 4 is a schematic illustration of a portion of the monolithic part of FIG. 1, according to one aspect of the disclosure;

FIG. 5A is a schematic illustration n of a portion of the monolithic part of FIG. 1, according to one aspect of the disclosure;

FIG. 5B is a schematic illustration of a portion of the monolithic part of FIG. 1, according to one aspect of the disclosure;

FIG. 5C is a schematic illustration of a portion of the monolithic part of FIG. 1, according to one aspect of the disclosure;

FIG. 6 is a schematic illustration of a portion of the monolithic part of FIG. 1, according to one aspect of the disclosure;

FIG. 7 is a block diagram of a method, according to one aspect of the disclosure;

FIG. 8 is a flow diagram of aircraft production and service methodology;

FIG. 9 is a schematic illustration of an aircraft.

In the block diagram(s) referred to above, solid lines, if an connecting various elements and/or components may represent mechanical, electrical, fluid, optical, electromagnetic and other couplings and/or combinations thereof. As used herein, "coupled" means associated directly as well as indirectly. For example, a member A may be directly associated with a member B or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring generally to FIGS. 1, 2, 2A, and 2B, and in particular to FIG. 1, one example of the present disclosure relates to a monolithic part 110 including an exterior wall 111 and a first cavity 112. The first cavity 112 includes a first aperture 115A in communication with the exterior wall 111 and a first inner surface 114 defining a first shape 114SH. The first shape 114SH prevents extraction from the first cavity 112, via the first aperture 115A, of a first virtual object 114S having the first shape 114SH. For example, the first inner surface 114 of the first cavity 112 may define the first shape 114SH configured such that the first cavity 112 cannot be formed by e.g. injection molding or other molding processes that use removable cores to form cavities. With particular reference to FIGS. 2, 2A, and 2B, those skilled in the art will appreciate that the first inner surface 114 of the first cavity 112 has the first shape 114SH configured such that if the first cavity 112 were formed using a core having the same shape as the virtual object 114S, extraction of the virtual core through the first aperture 115A would not be possible. For example, a dimension of the first cavity 112 may be larger than the corresponding dimension of the first aperture 115A.

With particular reference to FIG. 2, in one aspect of the disclosure, which may include at least a portion of the subject matter of any of the preceding and/or following examples and aspects, the first cavity 112 is a blind cavity and includes only a single aperture, i.e., the aperture 115A. The blind configuration of the first cavity 112 may be utilized when, for example, due to spatial constraints, the cavity cannot be simultaneously provided with both an inlet opening and a purge or vent opening. To fill a blind cavity, e.g., with an injectable substance, the substance must be introduced into the cavity using an application tool capable of simultaneously injecting the substance and drawing a vacuum or otherwise allowing the air inside the cavity 112 to escape to enable the substance to freely enter the cavity 112.

With particular reference to FIG. 2A, in one aspect of the disclosure, which may include at least a portion of the subject matter of any of the preceding and/or following examples and aspects, the cavity 112 also includes a second aperture 115B in communication with the exterior wall 111. The first shape 114SH of the first inner surface 114 prevents extraction from the first cavity 112, via the first aperture 115A or the second aperture 115B of the first virtual object 114S having the first shape 114SH. Referring once again to FIGS. 2A and 2B, those skilled in the art will appreciate that the first inner surface 114 of the first cavity 112 has the first shape 114SH configured such that if the first cavity 112 were formed using a core having the same shape as the virtual object 114S, extraction of the virtual core through either of the first aperture 115A or the second aperture 115B would not be possible. For example, a dimension of the first cavity 112 may be larger than the corresponding dimensions of the first aperture 115A and the second aperture 115B. In one example, the first aperture 115A and the second aperture 115B may be simultaneously provided to enable the first cavity 112 to be purged of air without using special tools when the cavity is being filled with an injectable substance. The monolithic part 110 having inner surfaces and features as described herein may be manufactured as described in further detail below.

Referring generally to FIG. 1 and in particular to FIG. 2B, in one aspect of the disclosure, which may include at least a portion of the subject matter of any of the preceding arid/or following examples and aspects, the monolithic part 110 includes an aperture plug 116 tethered to the exterior wall 111 adjacent the first aperture 115A. In one example, an aperture plug 116A may also be tethered to the exterior wall 111 adjacent the second aperture 115B. In one aspect, tethers, such as a tether 116T, connecting each of the aperture plugs 116, 116A to the exterior wall 111 may be severable tethers which, when severed, release the aperture plugs 116, 116A from the exterior wall 111 for insertion into their respective apertures 115A and 115B for closing or otherwise sealing the first cavity 112. Manufacturing the monolithic part 110 with the aperture plug(s) tethered to the exterior wall enables forming multiple parts of an assembly as a single piece, thus decreasing part count. Alternatively, tethers 116T connecting the aperture plugs 116, 116A to the exterior wall 111 may have sufficient length to enable insertion of the aperture plugs into their respective apertures without severing the tethers.

With particular reference to FIGS. 1 and 3, in one aspect of the disclosure, which may include at least a portion of the subject matter of any of the preceding and/or following examples and aspects, the first cavity 112 contains an insulative medium 113. The insulative medium may be any suitable medium for reducing noise, vibration, heat transfer, or other undesirable environmental phenomena that may be introduced inside a passenger cabin 101 of a vehicle 100, such as an aircraft, as will be described below. In one aspect of the disclosure, which may include at least a portion of the subject matter of any of the preceding and/or following examples and aspects, the insulative medium includes a flame-retardant additive, such as for example, any suitable Halogen-containing compound or a Halogen-free compound including, but not limited to, alumina trihydroxide and magnesium hydroxide.

Referring generally to FIGS. 1, 2A, and 2B, and in particular to FIG. 2B, in one aspect of the disclosure, which may include at least a portion of the subject matter of any of the preceding and/or following examples and aspects, the monolithic part 110 includes a second cavity 112A. The second cavity 112A includes a third aperture 115C in communication with the exterior wall 111, a fourth aperture 115D in communication with the exterior wall 111, and a second inner surface 114A defining a second shape 114SHA (FIG. 1), where the second shape 114SHA prevents extraction from the second cavity 112A, via the third aperture 115C or the fourth aperture 115D, of a second virtual object 114SA having the second shape 114SHA. The second inner surface 114 of the second cavity 112A may define the second shape 114SHA configured such that the second cavity 112A cannot be formed by e.g., injection molding or other molding processes that use removable cores to form cavities. Those skilled in the art will appreciate that the second inner surface 114A of the second cavity 112A has the second shape 114SHA configured such that if the second cavity 112A were formed using a core having the same shape as the second virtual object 114SA, extraction of the core through either of the third aperture 115C or the fourth aperture 115D would not be possible. In one example, the second cavity 112A may be a duct for transporting any one of a number of fluids. The duct may have a non-linear configuration, an example of which is illustrated in FIGS. 2, 2A, and 2B.

Referring generally to FIGS. 1, 5A, 5B, and 5C, and in particular to FIG. 1, in one aspect of the disclosure, which may include at least a portion of the subject matter of any of the preceding and/or following examples and aspects, the exterior wall 111 comprises at least one connecting feature 118 associated with at least one of the third aperture 115C and the fourth aperture 115D. With particular reference to FIGS. 5A, 5B and 5C, in one aspect of the disclosure, which may include at least a portion of the subject matter of airy of the preceding and/or following examples and aspects, the at least one connecting feature is one of a flange 118A, a bell 118C, or a bead 118B. The at least one connecting feature 118 enables connection or joining of the second cavity 112A of the monolithic part 110 to other monolithic parts and, alternatively or additionally, to components such as flexible hoses or rigid ducts. Referring generally to FIGS. 2A and 2C, and in particular to FIG. 2C, in one aspect of the disclosure, which may include at least a portion of the subject matter of any of the preceding and/or following examples and aspects, the monolithic part 110 includes a wall having a variable thickness. For example, the exterior wall 111 or another wall of the first and/or second cavity 112, 112A may have a variable wall thickness, including a minimum thickness T1 and a maximum thickness T2. In one aspect of the disclosure, which may include at least a portion of the subject matter of any of the preceding and/or following examples and aspects, the variable thickness is between about 0.3 min and about 3.0 mm. In other aspects, the variable thickness may be increased up to about 25 mm. However, those skilled in the art will appreciate that maintaining the variable thickness within the range of about 0.3 mm and about 3.0 mm will reduce manufacturing cycle time of the monolithic part 110.

With particular reference to FIG. 2A, in one aspect of the disclosure, which may include at least a portion of the subject matter of any of the preceding and/or following examples and aspects, the wall, such as the exterior wall 111, includes the minimum thickness T1. The monolithic part 110 includes a maximum dimension D and a rigidity factor of at least about 0.0007, where the rigidity factor is defined by a ratio of the minimum thickness T1 to the maximum dimension D. The maximum dimension may be, for example, the greater of a length, a width, and a height of the monolithic part 110. The rigidity factor greater or equal to about 0.0007 may provide the monolithic part with a structural rigidity for, e.g., supporting wires, cabin wall panels, and fluids passing through the monolithic part 110, while allowing the monolithic part to be compact for installation in the confined areas of for example, the passenger cabin 101 (FIG. 1).

Referring generally to FIGS. 1, 2B, 3, and 4, and in particular to FIG. 2B, in one aspect of the disclosure, which may include at least a portion of the subject matter of any of the preceding and/or following examples and aspects, the monolithic part 110 includes an integral wiring restraint 122. The integral wiring restraint 122 may enable the connection of one or more wires to the monolithic part 110 for restraining the one or more wires. In one aspect of the disclosure, which may include at least a portion of the subject matter of any of the preceding and/or following examples and aspects, the monolithic part 110 includes an integral mounting bracket 121. The integral mounting bracket 121 may enable the connection of one monolithic part 110 to another, to other parts, and/or to a mounting surface of the vehicle 100 (FIG. 1). With particular reference to FIG. 1, in one aspect of the disclosure, which may include at least a portion of the subject matter of any of the preceding and/or following examples and aspects, the monolithic part includes an integral connector 119. The integral connector 119 may enable the connection of one monolithic part 110 to another, to other parts, arid/or to a mounting surface of the vehicle 100 (FIG. 1). Referring generally to FIGS. 1 and 3 and with particular reference to FIG. 1, in one aspect of the disclosure, which may include at least a portion of the subject matter of any of the preceding and/or following examples and aspects, the integral connector is at least one threaded member 119A. Referring to FIG. 3, the at least one threaded member may be a threaded stud 119AS or a threaded aperture 119AN. These threaded members may enable the connection of one monolithic part 110 to another, to other parts, and/or to a mounting structure of the vehicle 100 (FIG. 1). With particular reference to FIG. 4, in one aspect of the disclosure, which may include at least a portion of the subject matter of any of the preceding and/or following examples and aspects, the integral connector is at least one snap-fit member 119B. The at least one snap-fit member 119B may be, e.g., a clip, a hook, or a receiver therefor and may enable the connection of one monolithic part 110 to another, to other parts, and/or to a mounting structure of the vehicle 100 (FIG. 1).

Referring to FIGS. 1 and 6, in one aspect of the disclosure, which may include at least a portion of the subject matter of any of the preceding and/or following examples and aspects, the monolithic part includes an integral anti-crush feature 117. In one aspect of the disclosure, which may include at least a portion of the subject matter of any of the preceding and/or following examples and aspects, the first cavity 112 includes a first wall 111A and a second wall 111B and the integral anti-crush feature 117 connects the first wall 111A and the second wall 111B. In one aspect, the first wall 111A and the second wall 111B may be part of the exterior wall 111 while in other aspects the first wall 111A and second wall 111B may be any wall of the first cavity 112. The integral anti-crush feature 117 improves crush resistance of the first cavity 112 to external loads applied to the cavity.

Referring to FIGS. 1 and 2B, in one aspect of the disclosure, which may include at least a portion of the subject matter of any of the preceding and/or following examples and aspects, the monolithic part 110 includes an integral reinforcement feature 120. With particular reference to FIG. 2B, in one aspect of the disclosure, which may include at least a portion of the subject matter of any of the preceding and/or following examples and aspects, the integral reinforcement feature 120 includes at least one locally thickened portion 120A of the monolithic part 110. For example, the locally thickened portion 120A may form a protrusion or rib that extends along any suitable (inner or outer) portion of, for example, the exterior wall 111, the first inner surface 114 of the first cavity 112, or the second inner surface 114A of the second cavity 112A. The locally thickened portion 120A may provide enhanced rigidity to the monolithic part.

Referring generally to FIGS. 1 and 7, and in particular to FIG. 7, one example of the present disclosure relates to a method of forming the monolithic part 110. The method includes additively forming the exterior wall 111 of the monolithic part 110 (FIG. 7, Operation 700), additively forming the first aperture 115A in communication with the exterior wall 111 (FIG. 7, Operation 705) and additively forming the first inner surface 114 of the first cavity 112 (FIG. 7, Operation 710), where the first inner surface 114 defines the first shape 114SH that prevents extraction from the first cavity 112, via the first aperture 115A, of the first virtual object 114S having the first shape 114SH. The operation 710 enables the monolithic part 110 to be formed with the first cavity 112, which could not otherwise be formed by e.g. injection molding or other molding processes that use removable cores to form cavities.

In one aspect of the disclosure, which may include at least a portion of the subject matter of any of the preceding and/or following examples and aspects, the method includes at least partially filling the first cavity 112 with the insulative medium 113 (FIG. 7, Operation 730). The insulative medium 113 may be introduced into the first cavity 112 using, e.g., an application tool capable of simultaneously injecting the substance and drawing a vacuum or otherwise allowing the air inside the cavity 112 to escape to enable the substance to freely enter the cavity 112.

In one aspect of the disclosure, which may include at least a portion of the subject matter of any of the preceding and/or following examples and aspects, the method includes additively forming the second aperture 115B in communication with the exterior wall 111 (FIG. 7, Operation 735). In one aspect of the disclosure, which may include at least a portion of the subject matter of any of the preceding and/or following examples and aspects, the first inner surface 114 defines the first shape 114SH that prevents extraction from the first cavity 112, via the first aperture 115A or the second aperture 115B, of the first virtual object 114S having the first shape 11SH. The second aperture 115B may be formed, e.g., to enable the first cavity 112 to be purged of air without using special tools when the cavity is being filled with a substance, such as the insulative medium 113.

In one aspect of the disclosure, which may include at least a portion of the subject matter of any of the preceding and/or following examples and aspects, the method includes additively forming the third aperture 115C in communication with the exterior wall 111 (FIG. 7, Operation 715), additively forming the fourth aperture 115D in communication with the exterior wall 111 (FIG. 7, Operation 720), and additively forming the second inner surface 114A of the second cavity 112A (FIG. 7, Operation 725), where the second inner surface 114A defines the second shape 114SHA that prevents extraction from the second cavity 112A, via the third aperture 115C or the fourth aperture 115D, of the second virtual object 114SA having the second shape 114SHA. The operation 725 enables the monolithic part 110 to be formed with the second cavity 112A, which could not otherwise be formed by e.g. injection molding or other molding processes that use removable cores to form cavities.

In one aspect of the disclosure, which may include at least a portion of the subject matter of any of the preceding and/or following examples and aspects, the method includes additively forming the aperture plug 116 tethered to the exterior wall 111 adjacent the aperture 115A and/or apertures 115B, 115C, and 115D (FIG. 7, Operation 740). Manufacturing the monolithic part 110 with the aperture plug(s) tethered to the exterior wall enables forming multiple parts of an assembly as a single piece, thus decreasing part count.

In one aspect of the disclosure, which may include at least a portion of the subject matter of any of the preceding and/or following examples and aspects, the method includes additively forming the monolithic part 110 with the varying wall thickness (FIG. 7, Operation 745), including a minimum thickness T1 and a maximum thickness T2. In one aspect of the disclosure, which may include at least a portion of the subject matter of any of the preceding and/or following examples and aspects, the method further includes additively forming the integral anti-crush feature 117 in the cavity 112 (FIG. 7, Operation 750). The operation 750 enables introduction into the cavity 112 of reinforcement features which could not be formed in the cavity using other methods, such as injection molding.

In one aspect of the disclosure, which may include at least a portion of the subject matter of any of the preceding and/or following examples and aspects, the method includes additively forming the integral reinforcement feature 120 on the monolithic part 110 (FIG. 7, Operation 755). Additively forming the integral reinforcement feature 120 may reduce part count and reduce manufacturing and/or assembly time, while providing reinforcement of the monolithic part 110.

In one aspect of the disclosure, which may include at least a portion of the subject matter of any of the preceding and/or following examples and aspects, the method includes additively forming the monolithic part 110 from a flame retardant material 110M (FIG. 7, Operation 760). Those skilled in the art will appreciate that flame-resistant properties of the monolithic part 110 may provide additional protection to the occupants of the passenger cabin 101 (FIG. 1). In one aspect of the disclosure, which may include at least a portion of the subject matter of any of the preceding and/or following examples and aspects, the monolithic part 110 may be constructed of a material having a Young's modulus, also known as the tensile or elastic modulus, of about 0.007 MPa to about 0.027 MPa, which indicates that the material will have an isotropic Young's modulus not less than about 3.5 gigapascal. In one aspect of the disclosure, which may include at least a portion of the subject matter of any of the preceding and/or following examples and aspects, the material may have a specific gravity of less than about 1.4.

In one aspect of the disclosure, which may include at least a portion of the subject matter of any of the preceding and/or following examples and aspects, the method includes forming the monolithic part 110 by one of stereolithography, laser sintering, fused deposition modeling, three-dimensional modeling, or laser engineered net shaping (FIG. 7, Operation 765).

Forming the monolithic part 110 as described above generates a part with integral nested features that serve multiple functions, such as ducting, thermal insulation, acoustic insulation, wiring restraint, mounting, and connection to various parts and support structures, thus reducing overall part count. Additively forming the monolithic part 110 with varying wall thickness allows to decrease the weight of the monolithic part 110, while maintaining its strength. Furthermore, part-tracking, storage, tooling, and assembly-resource demands are decreased, thus promoting lower manufacturing costs and shorter lead times.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 8 and an aircraft 1102 as shown in FIG. 9. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, the aircraft 1102 produced by the illustrative method 100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method of forming a monolithic aircraft part, the method comprising:
    additively forming a first cavity, defined by a first wall of the monolithic aircraft part, wherein additively forming the first cavity comprises:
        additively forming a first aperture, extending through the first wall;
        additively forming a second aperture, extending through the first wall; and
        additively forming a first inner surface of the first wall, defining a first shape, wherein a first object, permanently having the first shape, would not be able to be mechanically extracted from the first cavity via the first aperture or the second aperture:
    additively forming a second cavity, defined by a second wall of the monolithic aircraft part, so that the first cavity and the second cavity are not in communication with each other and share a common wall portion so that the second cavity is partially contained within the first cavity, wherein additively forming the second cavity comprises:
        additively forming a third aperture and a fourth aperture wherein the second wall extends beyond the first wall to define at least one of the third aperture and the fourth aperture; and
        additively forming a second inner surface of the second wall, defining a second shape, wherein a second object permanently having the second shape would not be able to be mechanically extracted from the second cavity via the third aperture or the fourth aperture; and
    filling the first cavity with one or more of an aircraft fire-insulation medium or an aircraft acoustic-insulation medium;
    wherein the second cavity forms a portion of an aircraft electrical system, aircraft hydraulic system, or an aircraft cabin environmental system.

2. The method of claim 1, further comprising additively forming an aperture plug, tethered to the first wall, defining the first cavity, adjacent the first aperture.

3. The method of claim 1, further comprising forming, on the second wall, at least one connecting feature associated with at least one of the third aperture and the fourth aperture.

4. The method of claim 1, further comprising forming at least one of the first wall of the first cavity or the second wall of the second cavity with a varying wall thickness.

5. The method of claim 1, further comprising additively forming an integral wiring restraint on the monolithic aircraft part.

6. The method of claim 1, further comprising additively forming a mounting bracket, integral with the first wall, for connecting the monolithic aircraft part to one or more other monolithic aircraft parts, to aircraft components, or to a mounting surface of an aircraft.

7. The method of claim 1, further comprising additively forming a connector, additively integrally formed with the first wall for connecting the monolithic aircraft part to one or more other monolithic aircraft parts, to aircraft components, or to a mounting surface of an aircraft.

8. The method of claim 7, wherein the connector is additively formed as one or more of a threaded member or a threaded aperture.

9. The method of claim 7, wherein the connector is additively formed as a snap-fit member.

10. The method of claim 1, further comprising additively forming an integral anti-crush feature within at least one of the first cavity or the second cavity.

11. The method of claim 1, further comprising additively forming an integral reinforcement feature on the monolithic aircraft part.

12. The method of claim 1, wherein:
the wall of the second cavity, defining the third aperture, is additively formed so as to extend beyond the wall of the first cavity on one side of the first cavity; and
the wall of the second cavity, defining the fourth aperture, is additively formed so as to extend beyond the wall of the first cavity on another side of the first cavity.

13. The method of claim 1, wherein the first wall of the first cavity is additively formed to have at least one locally thickened portion that forms a rib, extending along one or more of an outer surface of the first wall of the first cavity, an inner surface of the first wall of the first cavity, or an inner surface of the second wall of the second cavity.

14. The method of claim 1, further comprising forming the monolithic aircraft part by one of stereolithography, laser sintering, fused deposition modeling, three-dimensional modeling, or laser engineered net shaping.

15. The method of claim 1, further comprising additively forming an aperture plug, tethered to the first wall, defining the first cavity, adjacent the second aperture.

16. The method of claim 1, wherein the second cavity is additively formed so that a portion of the second wall of the second cavity defines at least one of the third aperture or the fourth aperture and extends beyond the first wall of the first cavity, defining a connecting feature, associated with a respective one of the third aperture or the fourth aperture, wherein the connecting feature joins the second cavity to another monolithic aircraft part or to aircraft components.

17. The method of claim 16, wherein the connecting feature is additively formed as a flange.

18. The method of claim 16, wherein the connecting feature is additively formed as a bell.

19. The method of claim 16, wherein the connecting feature is additively formed as a bead.

20. The method of claim 1, further comprising additively forming the monolithic aircraft part from a flame-retardant material.

* * * * *